United States Patent [19]

Krummen et al.

[11] Patent Number: 5,450,346
[45] Date of Patent: Sep. 12, 1995

[54] METHOD FOR THE AUTOMATIC CONTROL OF MANUFACTURING PROCESSES

[75] Inventors: Helmut Krummen, Titz/Gevelsdorf; Anton Schmitz, Dormagen; Manfred Selig, Burghausen, all of Germany

[73] Assignee: Wacker-Chemie GmbH, Munich, Germany

[21] Appl. No.: 211,842

[22] PCT Filed: Nov. 27, 1992

[86] PCT No.: PCT/EP92/02753

§ 371 Date: Apr. 18, 1994

§ 102(e) Date: Apr. 18, 1994

[87] PCT Pub. No.: WO93/11475

PCT Pub. Date: Jun. 10, 1993

[30] Foreign Application Priority Data

Nov. 28, 1991 [DE] Germany .................. 41 39 179.9

[51] Int. Cl.⁶ .................................... G05B 19/05
[52] U.S. Cl. ................... 364/468; 364/140; 364/147; 364/192
[58] Field of Search ............... 364/138–141, 364/146, 147, 468, 181, 191, 192

[56] References Cited

U.S. PATENT DOCUMENTS

| | | | |
|---|---|---|---|
| 4,639,852 | 1/1987 | Motomiya | 364/138 |
| 4,926,308 | 5/1990 | Giles et al. | 364/147 |
| 4,994,957 | 2/1991 | Komiya et al. | 364/147 |
| 5,301,100 | 4/1994 | Wagner | 364/141 |

FOREIGN PATENT DOCUMENTS 2275819 10/1976 France .
2641878 7/1990 France .
3838937 6/1989 Germany .

OTHER PUBLICATIONS

Frisch H. T., Voss W. ATP 30, 4, 186 (1988) pp. 186–190.
Horst K. H., Lieners J. J., ATP 31, 6, 282 (1989) pp. 282–286.
Laskowski, Michael, Technische Rundschau 83, 68 (1991) pp. 68–72.
Siemens "CEMAT 16", 1974, Best.Nr. E 265, 2021, 1–10.

Primary Examiner—Roy N. Envall, Jr.
Assistant Examiner—Steven R. Garland
Attorney, Agent, or Firm—Burgess, Ryan & Wayne

[57] ABSTRACT

The invention relates to a method for the automatic control of batch processes by means of a process control in which the automatic control programs access individual control modules, wherein a) the control instructions and parameter definitions contained in the partial formulations or phases of the formulation program are stored in a separate program level for the activation, interlocking and switch-on blocking of actuators in the field, b) in the separate program level, the control instructions and parameter definitions for each actuator to be activated are collected actuator by actuator and, if appropriate, logically combined, and c) the currently effective activations, interlockings and switch-on blockings are output, actuator by actuator, to the process operating and monitoring system.

7 Claims, 10 Drawing Sheets

VE1219　　ETHYLENE CONTROL VALVE

STR 1　　FBO 1　　　　　　　TIO 0
　　　　 FBC 0　　　　　　　MALF 0
　　　　　　　　　　　　　　 SA 0
A 1　　　OPEN 0
M 0　　　CLOSED 0

FIG. 3
PRIOR ART

```
                          SETPOINT R1100
                          ┌─────────────────┐
                          │      INTERF.    │
SAFTY SETPOINT VALUE ANA0─┤ 20,0            │
SETPOINT VALUE FROM BF 1191 ANA1─┤ 37,0     │
SETPOINT VALUE FROM BF 1182 ANA2─┤ 45,0     │
SETPOINT VALUE FROM BF 1191 ANA3─┤ 70,0     │
SETPOINT VALUE FROM C  1101 ANA4─┤ 85,0     │
SETPOINT VALUE FROM BF 1130 ANA5─┤ 49,0     │
                       ANA6─┤ 0,0           │
                       ANA7─┤ 0,0           │
                       ANA8─┤ 0,0           │
                                  0 ─ERROR─
                               70,0 ─OUTP. EXT SETPOINT VALUE R1100
                          INTERF. 1100
```

FIG. 9

```
                                    SETPOINT R1100
                                  ┌─────────────────┐
                                  │    INTERF.      │
SAFTY SETPOINT VALUE ANA0─        │      20,0       │
SETPOINT VALUE FROM BF 1191 ANA1─ │      37,0       │
SETPOINT VALUE FROM BF 1182 ANA2─ │      45,0       │
SETPOINT VALUE FROM BF 1191 ANA3─ │      70,0       │
SETPOINT VALUE FROM BF 1101 ANA4─ │      85,0       │
SETPOINT VALUE FROM BF 1130 ANA5─ │      49,0       │
                            ANA6─ │       0,0       │
                            ANA7─ │       0,0       │
                            ANA8─ │       0,0       │
                                  │                 │
                                  │        1 ─ERROR─DEBLOCKING ERROR
                                  │     20,0 ─OUTP. EXT SETPOINT R1100
                                  └─────────────────┘
                                        INTERF. 1100
```

FIG. 10

METHOD FOR THE AUTOMATIC CONTROL OF MANUFACTURING PROCESSES

BACKGROUND OF THE INVENTION

The invention relates to a method for the automatic control of batch processes by means of a process control in which automatic control programs access individual sequential controls.

Batch processes are processes in which the desired product is produced in a time-sequential succession of process-engineering subtasks according to a predetermined specification. The sequence of such processes can be controlled by means of an automatic process control. Such automatic process controls consist of two basic blocks, the hardware and the software.

The hardware components comprise one or more central processor units with internal or external storage units and input and output units, for example analog or binary input and output cards for communication with the systems to be controlled; keyboard, mouse or light pen for operating the process control and display screen or printer for observing the process control.

The software contains the formulation programs and/or general interlocking and/or sequence programs and the process-relevant software components. The formulation programs are the process specifications with the basic operations and their sequential organization for producing a product in the batch process to be controlled. Such formulation programs are usually structured into partial formulations which control the parallel or sequential execution of subtasks in different process units.

The elementary modules of the formulation programs or partial formulations are the phases. The phase programs are structured into the control part (sequential part), the parameter part and the communication part. The control part contains the program elements for the step sequence of the basic operations of the process with the particulars of the initial conditions, the process steps and their combination, the final conditions and the step sequence in the event of malfunctions. The parameter part for controlling a chemical process may comprise, for example, the feedstocks and their amount, the normal time for a process step, the process variables (set-point values and limiting values for temperature, pressure etc.) and the permissible operating actions. The communication part contains the program components for the data exchange between the phases and the data exchange with the operator for signaling faults or the current state of the process. The communication part further contains the program elements for activating the process-relevant software of the individual control level, that is to say the individual control modules which effect, for example, the activation of the controllers, valves or motors of the process system.

The process-relevant software, that is to say the modules for individual activation, are programs which are activated by the sequence programs (formulation) and convert their commands for controlling one or more operands (actuators), for example controllers, valves, motors.

FIG. 1 shows the principle of the process control of a batch process corresponding to the prior art: The formulation program for controlling the entire process contains a plurality of partial formulations, called automatic control programs here. During the program execution, the automatic control programs directly access the hardware of the plant or activate one or more individual control modules for the activation or interlocking of controllers, valves or motors. In this process, the individual control modules activate, in each case, an actuator in the field. During the sequence of the process control, feedback on the state of the equipment in the field is given to the individual control level or to the automatic control programs and to the process operating/process monitoring system.

During the program execution, different automatic control programs in some circumstances simultaneously access one individual control module or one actuator in the field. The frequency of such simultaneous activations or the interlockings thereof increases drastically with increasing complexity of the software programs. If, in the case of such complex programs, malfunctions are then signaled to the operating personnel, for example "opening of a valve is interlocked", it cannot be unequivocally analyzed where the error originates from. The malfunction may originate from a defective sensor, the error may lie in the hardware of the process control (defective card, blown fuse), it may concern a program error in the sequence chain of the formulation programs, there may be an operating error (valve is set for manual operation) or the interlocking may have been initiated by the process conditions (pressure in the vessel too high, opening of the valve therefore interlocked).

If the software interface of the formulation programs to the hardware is carried out according to the prior art, via an individual control level, as in FIG. 1, although the operating personnel in the control room still have the opportunity to distinguish whether the error lies in the field equipment, it is not possible to give more comprehensive information as to whether the error then lies in the automatic control programs or in the hardware. It cannot be readily ascertained which currently accessing automatic control program is currently performing which function. The causes of, for example, a machine-protection interlocking, a process-dependent interlocking or an activation lock cannot be recognized. Although, using the process control methods known hitherto, it is possible to ascertain the status of an actuator, it cannot be understood how, by means of which accesses of which basic functions of the phases of the process control, this status has occurred.

In "Automatisierungstechnische Praxis—ATP. Vol. 31, No. 6, June 1989, Munich, pages 282–286", a standard software package "basic functions" is described, which is tied to superimposed automatic control programs. For process monitoring, it can be displayed whether a basic function is currently accessing an actuator (LUPE), which interlocking conditions apply to which basic functions (VERA) and which basic functions can be operated by an actuator (GFLI). The storage, actuator by actuator, in an intermediate level of phases of the automatic control programs for the activation (for example from basic functions) and for the interlocking and for the switch-on blocking of one or more actuators and the logical combination thereof is not described and not suggested by anything.

"Automatisierungstechnische Praxis—ATP, Vol. 30, No. 4, 1988, Munich, pages 186–190 describes a standard software package "basic functions" which is integrated into a process control system. For monitoring the process to be controlled, the statistical operating statuses of the actuator and the activation (basic function) currently effective are displayed. The storage of the phases of the automatic control programs which affect the activation, interlocking and switch-on blocking, and also the process-logical combination thereof, in a separate program level is not described. The output to the operating/monitoring system of the currently effective activations, interlockings and switch-on blockings and the process-logical combinations thereof are also not described.

The object was therefore to develop a method for the automatic control of batch processes by means of a process control in which automatic control programs access individual sequential controls, by means of which method the current activations of the individual activations of the actuators in the field are recognizable such that unambiguous information about malfunctions and their causes is possible, which is essential for the elimination of malfunctions and is a decisive factor for the safety, availability and economic efficiency of a plant.

SUMMARY OF THE INVENTION

The invention relates to a method for the automatic control of batch processes by means of a process control in which automatic control programs access individual control modules, wherein
 a) the control instructions and parameter definitions, contained in the partial formulations or phases of the formulation program, are stored in a separate program level for the activation, interlocking and switch-on blocking of actuators in the field,
 b) in the separate program level, the control instructions and parameter definitions for each actuator to be activated are collected, actuator by actuator, and, if appropriate, logically combined, and
 c) the currently effective activations, interlockings and switch-on blockings are output, actuator by actuator, to the process operating/process monitoring system.

BRIEF DESCRIPTION OF THE DRAWINGS

FIG. 3 is a visual display of the state of an ethylene control valve according to the prior art;

FIG. 9 is a diagram showing how basic activation is carried out from the basic function BF1191 using a setpoit value; and FIG. 10 is a diagram showing how there is no deblocking from the intermediate level.

DESCRIPTION OF THE PREFERRED EMBODIMENT

Figure 1:
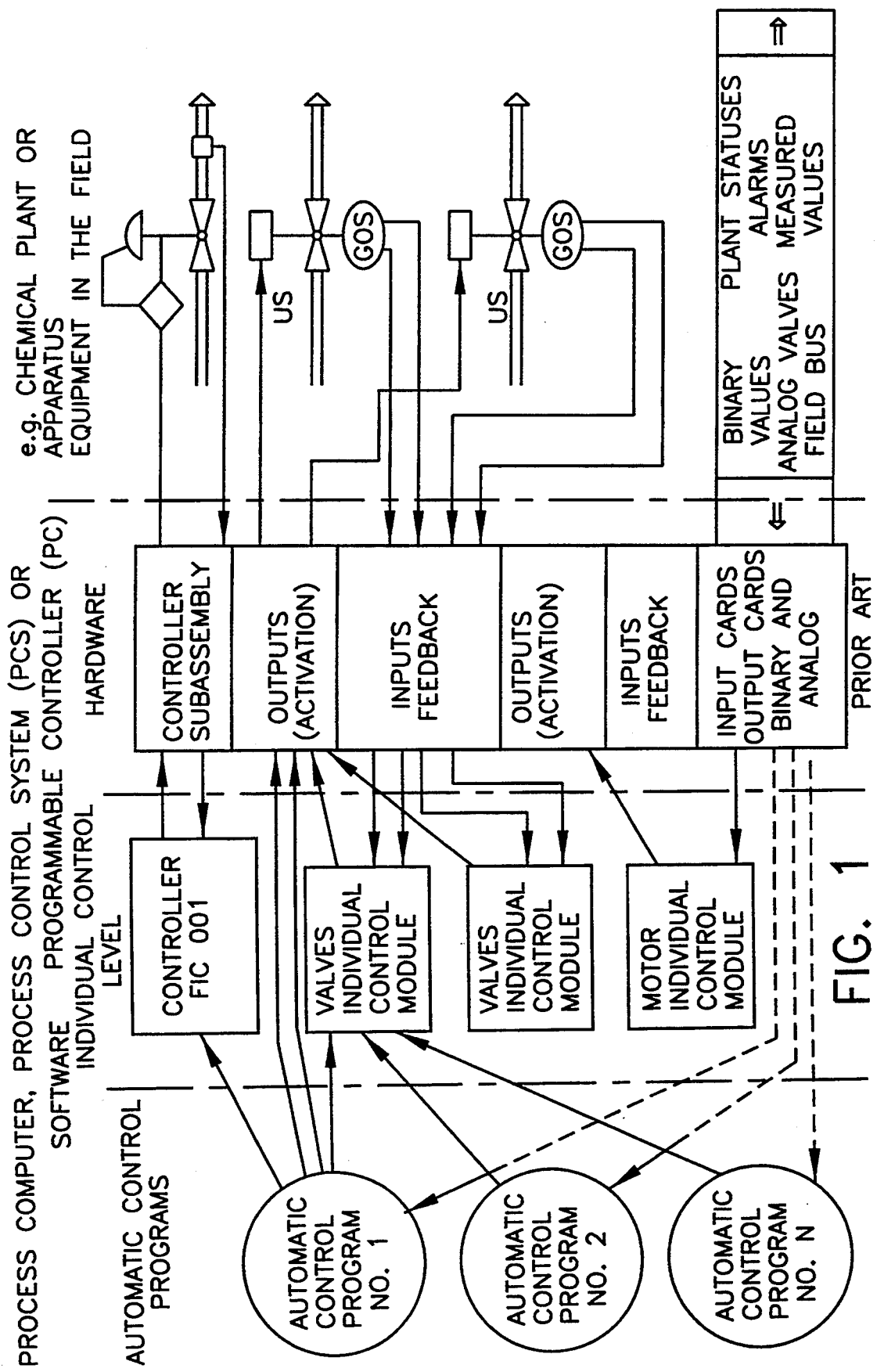
FIG. 1 is a schematic diagram used to show process control of a batch process according to the prior art.
Figure 2:
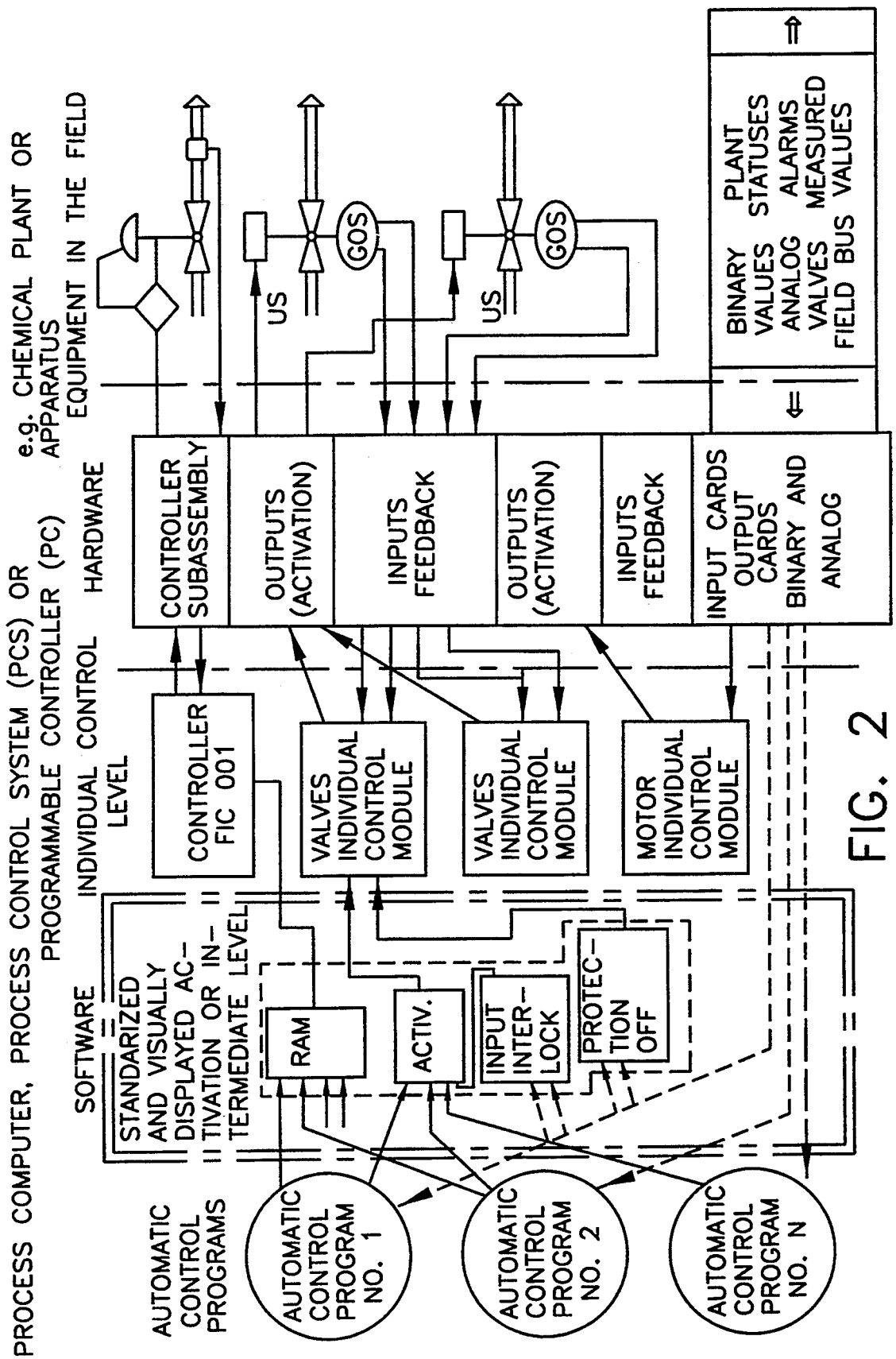
FIG. 2 is a schematic diagram used to show process control of a batch process according to the present invention.

FIG. 2 shows, with reference to the example of a batch process from the chemical industry, the principle, according to the invention, of a process control in which the activation of controllers and valves, the interlocking of valves and the switch-on blocking of valves are stored in a separate program level (intermediate level). The automatic control programs do not directly access the hardware of the plant or the process-relevant individual modules for activation or interlocking of actuators, for example controllers or valves, but access, via the separate program level (intermediate level), the individual modules for the control or interlocking of the controllers and valves. During the process sequence, feedback on the status of the interlockings or the status of the switch-on blockings is given to the intermediate level of the software of the process control. The status of the currently effective activations and interlockings is output at the process operating/process monitoring system.

By means of the method according to the invention, the control instructions and parameterizations for individual or a plurality of activations and/or interlockings and/or switch-on blockings of one or more actuators are stored in the aforementioned intermediate level. The control instructions and parameterizations for all activations and/or interlockings and/or switch-on blockings of all actuators activated by the process control are preferably stored in the aforementioned intermediate level. The components of the automatic control programs, which according to the invention are stored in the intermediate level, contain no instructions for sequential control. The actuator-based activations, interlockings and switch-on blockings are in each case combined specific to the process by means of an "and" or "or" operation.

In the case of the activation of controllers as actuators, there is preferably an "or" operation. The individual control module of a controller is activated with a setpoint value from the intermediate level (interface level) only in the event of definite activation of the intermediate level. Otherwise there is no activation or an activation with a safety setpoint value.

For operator monitoring of the process control, individual, a plurality of or all the existing activations and/or interlockings and/or switch-on blockings of an actuator can be displayed in the process operating/process monitoring systems. The activations, interlockings and/or switch-on blockings are displayed in the operating/monitoring system, either actuator by actuator (for example for a specific valve) or actuator group by actuator group, with display of the logical combinations between the statuses of the actuators. The activations, interlockings and blockings of an actuator in the process operating/process monitoring system are preferably assembled to form a picture. In a particularly preferred embodiment, these displays may be additionally complemented by the display of static operating statuses. For a valve, this will be, for example, particulars about valve-opening and/or valve-closing times, operating state of the automatic process control (off-/on), manual blocking (yes/no).

For a clearer visual display, the activation, interlocking and switch-off blocking states may be indicated with clear text and the possible and currently effective states differentiated by change of text or color.

The method according to the invention will be demonstrated below with the example of an ethylene control valve (VE 1219) which controls the ethylene feed to a reactor.

FIG. 3 shows a visual display of the current state of the ethylene control valve as it is received by process control systems corresponding to the prior art and in which the automatic control programs directly activate the individual control modules.

The following feedbacks are obtained from the output of the individual control level:

STR 1=Activation from the automatic control level
FBO 1=Feedback from the process—valve open
FBC 0=Feedback from the process—valve not closed Feedbacks from the input of the individual control level:

$M=0$; $A=1$ Activation from automatic programs active
$M=1$; $A=0$ Activation from manual level active if the manual level is active, the following can be controlled:

OPEN=1; CLOSED=0 Manual operation OPEN
OPEN=0; CLOSED=1 Manual operation CLOSED

Feedback from the individual control surveillance for recognition of malfunction:

TIO 0=Timeout
MALF 0=No malfunction
SA 0=Switch-on blocking off

Thus, the only information obtained is that the individual control module of the ethylene control valve is activated by the automatic control program and the valve is open. It cannot be recognized which basic function of the automatic control program activates the valve and which combinations between the basic functions of the various activations and interlockings open the valve.

Figure 4:
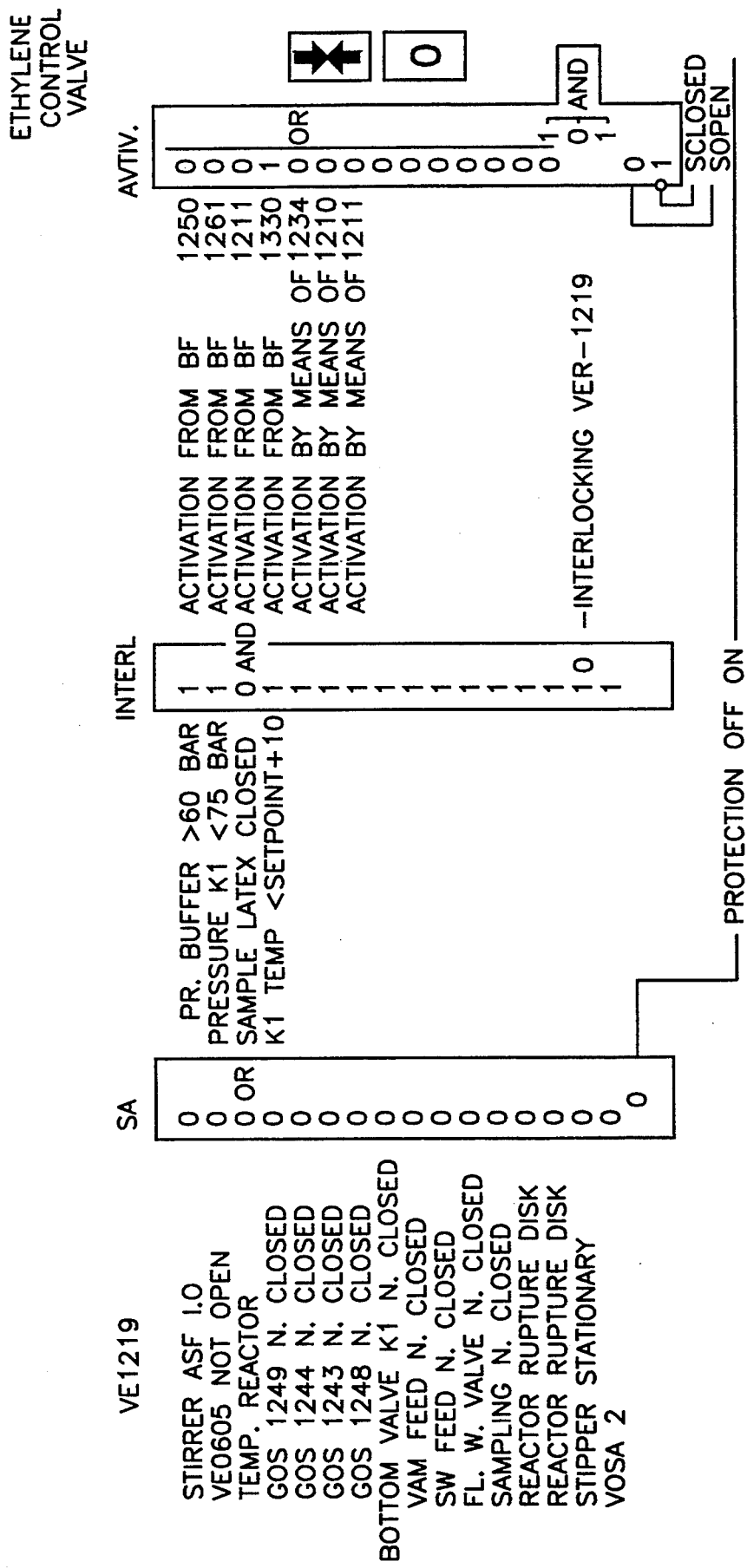
FIG. 4 is a visual display of the activations, interlocking and switch-on blocking according to the present invention of the same ethylene control valve used with FIG. 3.

FIG. 4 shows the visual display according to the invention of the activations, interlockings and switch-on blockings (protection off) of the ethylene control valve VE 1219 with process control using the method according to the invention:

On the left-hand side, the conditions for the inactivation of the switch-on blocking SA are listed. The abbreviations have the following meaning:

STIRRER AFS I.O.=Stirrer axial face seal is open
VE0605 NOT OPEN=Valve 0605 not open
TEMP.REACTOR =Temperature in reactor<limiting value
GOS 1249 N. CLOSED=Feedback valve 1249 not closed
GOS 1244 N. CLOSED=Feedback valve 1244 not closed
GOS 1243 N. CLOSED=Feedback valve 1243 not closed
GOS 1248 N. CLOSED=Feedback valve 1248 not closed
BOTTOM V.K1N.CLOSED=Bottom valve K1 not closed
VAM FEED N. CLOSED=Vinyl acetate monomer feed not closed
SW FEED N. CLOSED=Soft water feed not closed
FL.W.Valve N. CLOSED=Flush water valve not closed
SAMPLING N. CLOSED=Sampling tap not closed
REACTOR RUPTURE DISK=Rupture disk not burst
REACTOR RUPTURE DISK=Rupture disk not burst
STIRRER STAT=Operating status of stirrer
VOSA 2=Overriding protective cut-out function If these conditions are met, the status display has a dark background and has a status of 0 or 1. The individual conditions are combined with "or" logic in the intermediate level according to the invention; if one of them has not been fulfilled, "protection off", that is to say switch-on blocking, is activated. This has priority over all interlocking or activation conditions, both in the automatic control level and in the manual level (no interlocking with these basic functions).

In the present case, all conditions are fulfilled and the switch-on blocking is not active.

In the middle, the conditions for opening the interlocking of the valve are listed. These conditions, comprising maintenance of defined pressure ranges and temperature ranges and closed sampling tap for latex, are "and" combined in the intermediate level, that is to say they must be met cumulatively (dark background) so that no interlocking of the valve takes place. The abbreviations have the following meaning:

PR.BUFFER>60BAR=Pressure buffer greater than 60 bar
PRES.K1<75 BAR=Reactor pressure less than 75 bar
SAMPLE LATEX CLOSED=Sampling tap closed
K1 TEMP<SETPOINT+10=Reactor temperature<setpoint value+10° C.

On the right-hand side, the activations of the valve are listed with which the valve can be activated from the basic functions BF (in this case BF1250, BF1361, BF1211), from the individual motor control level ML (in this case ML1234), or from the individual valve control level VE (in this case VE1210, VE1211). The controls are "or" combined, that is to say activation is sufficient to open the valve. If the valve is activated from an activation (in this case BF1211), the field (0,1) has a dark background.

The current status of the ethylene control valve in the present case is, as can be seen on the right-hand edge (arrow symbol, dark background 0): "closed". Although the valve is activated and the switch-on blocking is not activated, the valve is still not open. According to the methods known hitherto, without an intermediate level, the cause for this would only be ascertainable after relatively long investigations.

As FIG. 4 shows, with the method according to the invention, the cause can be ascertained at a glance: one of the "and" combined conditions for opening the interlocking is not fulfilled—the sampling tap is open. Since the interlocking conditions and the activations are combined with "and" logic, the ethylene control valve remains closed, despite activation, since the control bit of the individual activation is not activated (display SCL with dark background).

FIG. 5 again shows the visual display of the status of the program parts of the process control which are effective in the intermediate level. As in FIG. 4, the ethylene control valve is also closed in this case, although it is activated by the basic function BF1211. In contrast to FIG. 4, however, all conditions for inactivation of the interlockings are fulfilled in this case. The "and" logic between the interlocking block and the activation block sets the control bit for the individual activation of the valve to "SOPEN". The cause of the failure to open in this case is that one of the conditions for inactivation of the switch-on blocking is not fulfilled: the bottom valve K1 is open. Since one of the conditions in the protection-off block, in which the conditions are combined with "or" logic, is thus not fulfilled, the valve can neither be activated in automatic mode nor by manual operation.

Figure 5:
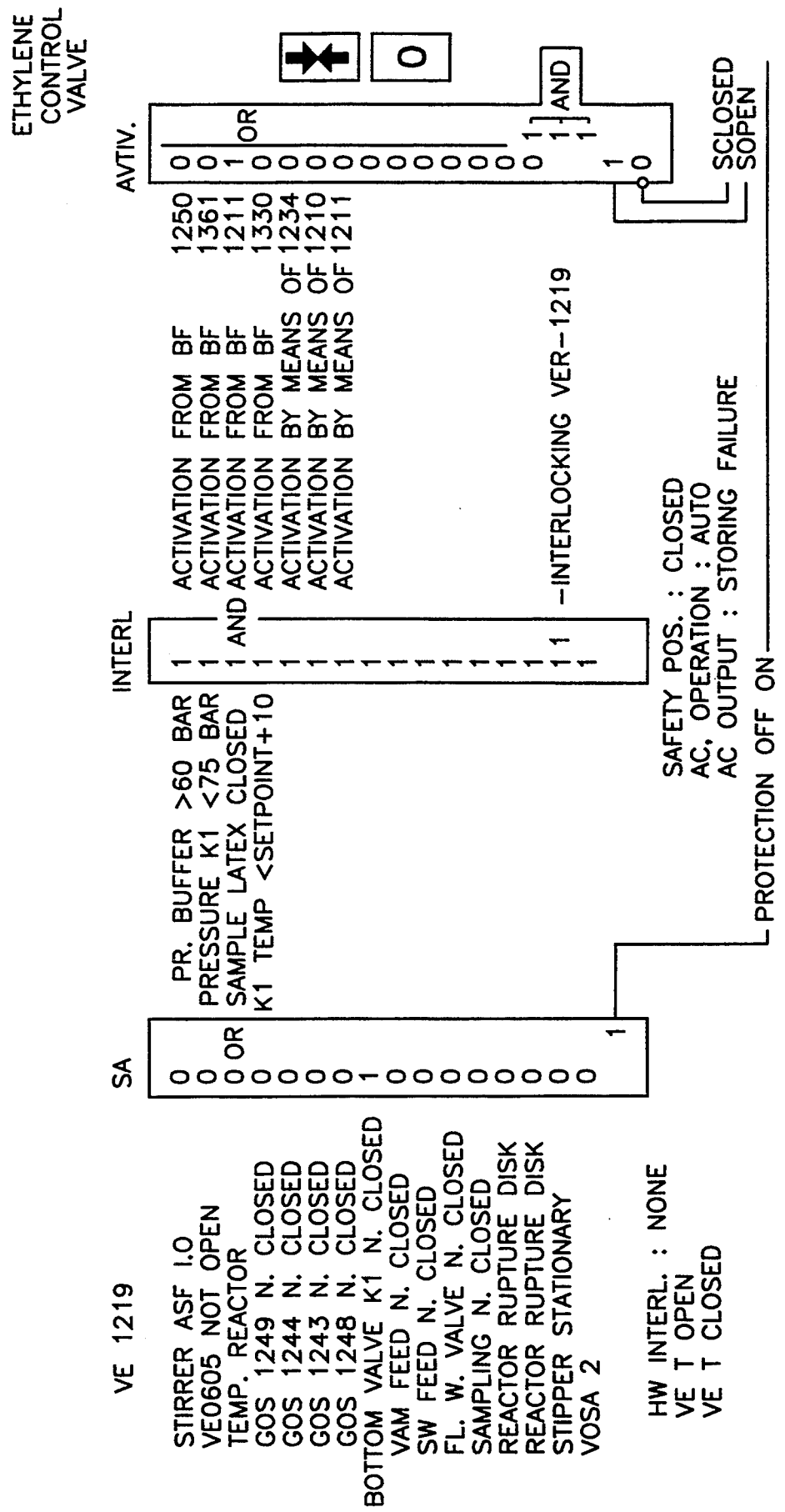
FIG. 5 is a visual display of the status of the program parts of the process control according to the present invention of the same ethylene control valve used with FIG. 4.

FIG. 5 also shows a visual display of additional information on the statistical statuses of the valve: hardware interlocking, valve opening and closing times, safety position, operating status of the automatic control. The meaning of the abbreviations is as follows:

HW-INTERL:NONE = no hardware interlocking
VE TOPEN:7 SEC = individual valve control time open
VE TCLOSED:3 SEC = individual valve control time closed
SAFETY POSITION:CLOSED = valve interlocked in safety position
AC-OPERATION:AUTO = automation program running
AC OUTPUT: STORING FAILURE = in the event of failure of the automation program, the last functions executed are executed again.

Figure 6:
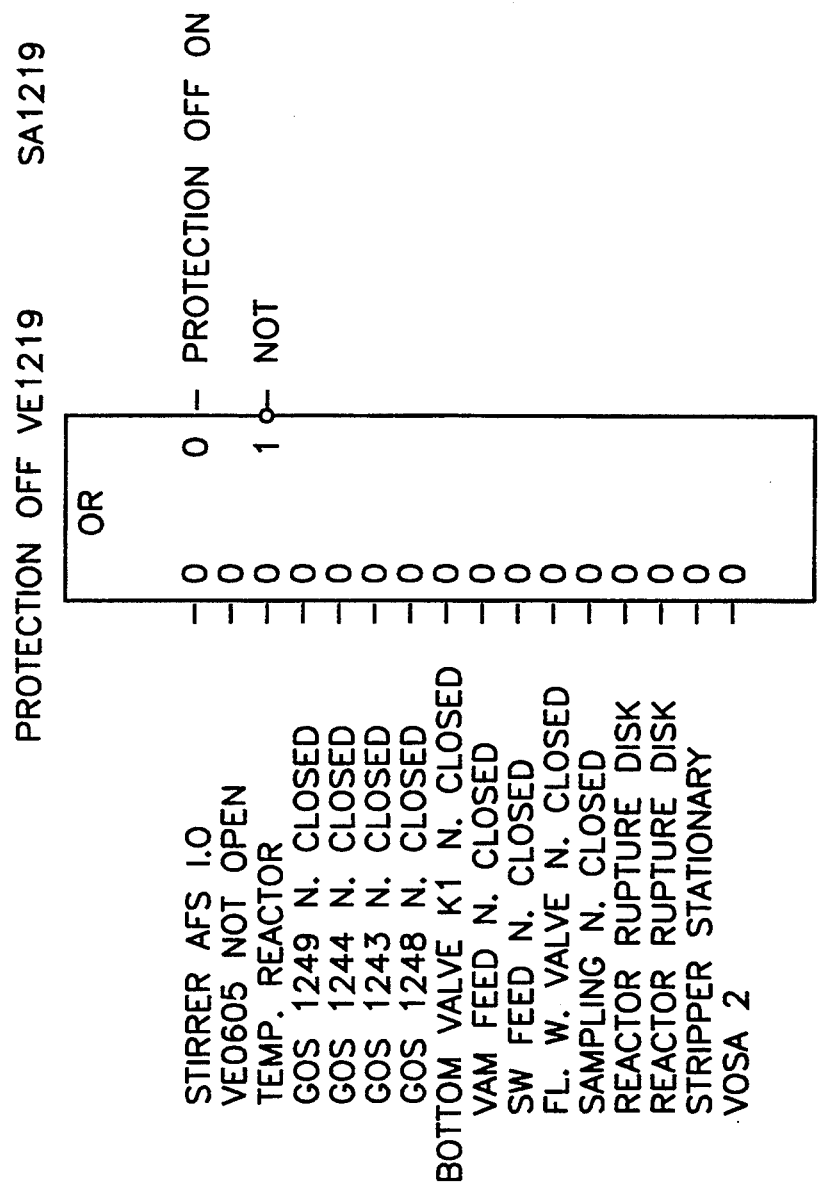
FIG. 6 is a visual display of the switch-blockings of FIG. 4.
Figure 7:
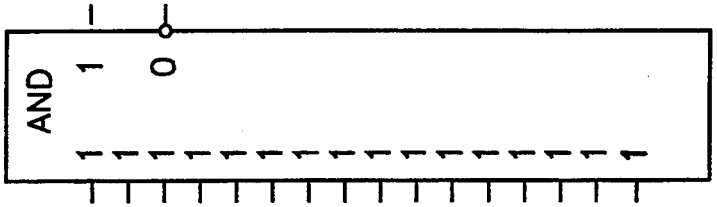
FIG. 7 is a visual display of the interlockings of FIG. 4.
Figure 8:
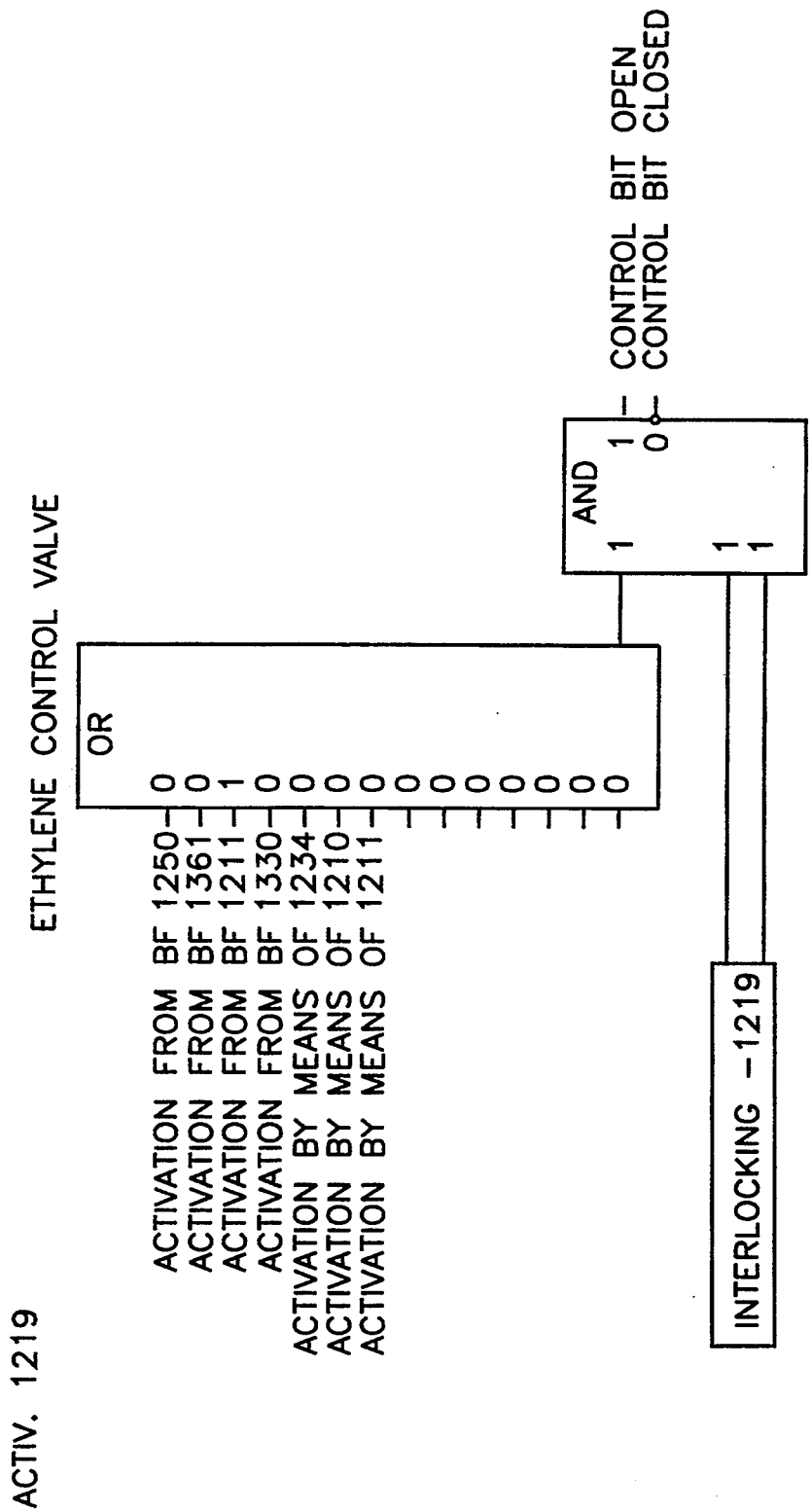
FIG. 8 is a visual display of the activations of FIG. 4.

FIGS. 6, 7 and 8 show the blocks, illustrated in FIG. 4 in their logical combination, comprising the switch-blockings (FIG. 6) the interlockings (FIG. 7) and the activations (FIG. 8) illustrated individually on the process operating and process monitoring system.

FIG. 9 and FIG. 10 show the activation of the controller INTERFl100 via the interface level (intermediate level) Rl100. The intermediate level may be activated, via various inputs (in this case ANA0 to ANA8), using setpoint values from various basic functions (in this case BFl191, BFl182, BFl130), control functions (in this case C-1101) and a safety setpoint value.

In FIG. 9, activation is carried out from the basic function BFl191 using a setpoint value and the setpoint value is connected through to the output—the control variable is set. In FIG. 10, there is no deblocking from the intermediate level, but rather the safety setpoint value is output. Using the method according to the invention, the causes for this deblocking error can be recognized: the intermediate level is not activated with a distinct control value, but rather via two different basic functions BFl191 and BFl130 respectively with two different setpoint values.

The advantages of the method according to the invention are that the activations, interlockings and switch-on blockings hitherto contained in different automatic control programs are now stored and visually displayed, actuator-specifically, in a separate program level (intermediate level). By virtue of the introduction and standardization of the intermediate level, for example in the case of valves and motors in activation (AC-TIV), interlocking (INTERL) and switch-on blocking level (SB) and with setpoint through-connection to controllers in the interface level (INTERF), unmeshing of the automatic control programs has been achieved to a large extent. Furthermore, the automatic control programs are freed of troublesome auxiliary software by means of this displacement and thus become necessarily clearer, having a positive effect on the quality assurance of the automatic control programs.

The consistent visual display of this standardized intermediate level, for the operating personnel of the process control, acts as a window into the automatic control programs and shows the personnel, for the individual actuators, the dynamic statuses (currently effective activations, interlockings and switch-on blockings) and also the static statuses (safety position, opening and closing times). Unambiguous information about malfunctions and their causes can thus be given, which is essential for the elimination of malfunctions and is a decisive factor for the safety, availability and economic efficiency of a plant.

We claim:

1. A method for automatic control of batch processes by means of a process control in which automatic control programs (1) are used to access individual control modules (2), comprising the steps of:
    a) storing control instructions and parameter definitions, contained in partial formulations or phases of the automatic control programs, (1), in a separate program (4) for activation, interlocking and switch-on blocking of actuators (3)
    b) collecting in the separate program (4), the control instructions and parameter definitions for each actuator (3) to be activated, actuator by actuator, and logically combined the collected control instructions and parameter definition for each actuator to be activated, and
    c) outputting currently effective activations, interlockings and switch-on blockings actuator by actuator to a process operating and monitoring system (5).

2. The method as claimed in claim 1, wherein there is included in the said step of storing, the control instructions and parameter definitions corresponding to at least one activation, interlocking and/or switch-on of blocking at least one actuator in the aforementioned separate program (4).

3. The method as claimed in claim 1 wherein said step of storing includes the steps of storing the control instructions and parameter definitions corresponding to all activations interlockings and/or switch-on blocking of all actuators (3) activated by the process control into the separate program.

4. The method as claimed in claim 1, further comprising the step of displaying for operator monitoring of the process control, at least one existing activation, interlocking and/or switch-on blocking of an actuator (3) in the operating and monitoring system (5).

5. The method as claimed in claim 4, wherein said step of displaying includes the step of displaying the activations, interlockings, switch-on blockings and/or logical combinations there between in the monitoring system (5), in one of:
    actuator by actuator, and
    actuator group by actuator group.

6. The method as claimed in claim 4 wherein the step of displaying includes the step of collecting activations, interlockings and blockings of an actuator (3) in the process operating and monitoring system (5) to form a picture.

7. The method as claimed in claim 4, wherein said step of displaying further includes the step of displaying static operating statuses.

* * * * *